May 14, 1968
R. A. TIGNER
3,382,537
ADJUSTABLE EXTRUSION DIE
Filed March 21, 1966
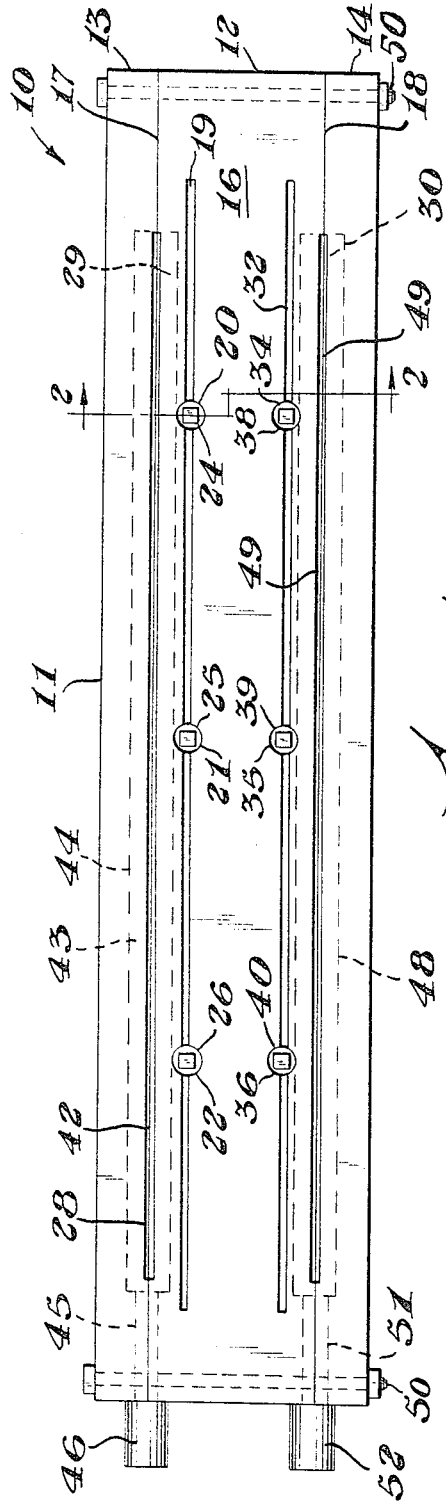
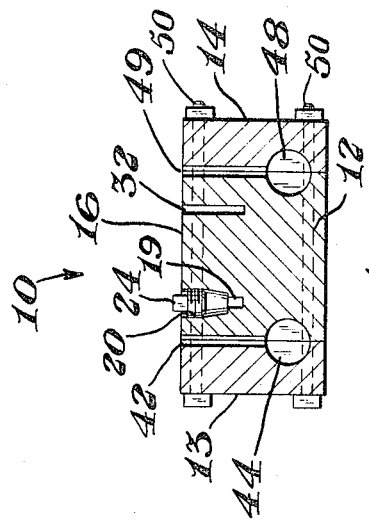
INVENTOR.
Ruben A. Tigner
BY
AGENT United States Patent Office 3,382,537
Patented May 14, 1968

3,382,537
ADJUSTABLE EXTRUSION DIE
Ruben A. Tigner, Bay City, Mich., assignor to The Dow Chemical Company, Midland, Mich., a corporation of Delaware
Filed Mar. 21, 1966, Ser. No. 535,796
2 Claims. (Cl. 18—12)

ABSTRACT OF THE DISCLOSURE

An adjustable extrusion die is provided by slotting the die body adjacent and parallel to the extrusion passageway, providing threaded, tapered plugs to permit selective deformation of the extrusion die by bending the portion of the die body forming at least one of the die lips.

This invention relates to an extrusion die and more particularly relates to an adjustable die particularly adapted for the extrusion of synthetic resinous materials.

Oftentimes, it is desirable to extrude a heat plastified synthetic resinous material in the form of a sheet and frequently it is desirable to simultaneously extrude two sheets in side by side relationship. When extruding a sheet in accordance with the methods known to the art, a die is usually profiled. By the term "profiled," is meant shaped to cause the heat plastified synthetic resinous material to extrude from a slot in the die in such a manner that a sheet of uniform thickness is obtained. Generally, such dies are relatively bulky and/or require a complex adjusting mechanism which forms the flow from the slot in the die in such a manner that a sheet of uniform thickness is obtained. Oftentimes, such dies utilize a large plenum to receive the heat plastified thermoplastic material and a narrow slot. Such dies are often center fed and have an internal cavity having a peripheral configuration somewhat resembling a coat hanger which is thick toward the upper portion of the coat hanger and tapers toward the bottom and terminates in a narrow slot.

It would be desirable if there were available a simple die adapted to extrude synthetic resinous thermoplastic material and was readily adjustable.

It would also be advantageous if there were available an improved die for the simultaneous extrusion of two or more sheets.

These benefits and other advantages are achieved in an extrusion die comprising a body defining an internal plenum, the body defining an extrusion orifice in connection with the plenum, the body defining means to receive a stream of thermoplastic synthetic resinous material in communication with the plenum, the body defining adjacent die lips, the body defining a slot generally parallel to the extrusion orifice and extending inwardly into the body, a movable land integral with the body disposed between the slot and the extrusion orifice, the body defining a plurality of generally circular tapered openings extending into the slot and being spaced in apart relationship to each other, an externally threaded tapered plug disposed in at least one of the openings, wherein varying the width of the extrusion orifice is accomplished by rotation of the tapered threaded plug to displace the land toward or away from the extrusion orifice.

Further features and advantages of the present invention will become more apparent from the following specification taken in connection with the drawing wherein:

FIGURE 1 depicts a face view of a double slot die in accordance with the invention.

FIGURE 2 is a sectional view of the die of FIGURE 1 taken along the line 2—2.

In FIGURE 1 there is illustrated a die generally designated by the reference numeral 10. The die 10 comprises a die body 11. The die body 11 comprises a first or central portion 12, a second portion 13 and a third portion 14. The portions 13 and 14 are remotely disposed from each other. The central portion 12 has an elongated configuration and defines a face 16, a first edge 17 and a second edge 18. The body portion 12 also defines a first slot 19 disposed in parallel relationship to the first edge 17. The first body portion 12 defines a plurality of openings 20, 21 and 22 disposed within the slot 19. The openings 20, 21 and 22 are of a tapered configuration and have disposed therein plugs 24, 25 and 26, respectively. The plugs 24, 25 and 26 have an externally threaded configuration adapted to mate with the internally threaded configuration of the openings 20, 21 and 22, respectively. The slot 19 extends into the body portion 12 for a depth equal to or greater than the depth of the threaded openings 20, 21 and 22. The first edge 17 of the first body portion 12 defines a recess 28 which is outwardly facing and is disposed generally normal to the direction in which the slot 19 is facing. The edge 17 of the body portion 12 is relieved and defines and elongate recess 29 which is in communication with the recess 28 and extends to the surface 16 of the body portion 12. The second edge 18 of the first body portion 12 is relieved to define a recess 30 generally oppositely disposed from the recess 28 and is relieved to provide a portion of a passage communicating with surface 16 and the recess 30. A slot 32 is disposed in parallel relationship to the edge 18. The slot 32 has defined therein a plurality of internally tapered openings 34, 35 and 36 similar to the openings 20, 21 and 22 of the slot 19. Within the openings 34, 35 and 36 are disposed externally threaded tapered plugs 38, 39 and 40, respectively. The second body portion 13 is rigidly secured to the first edge 17 of the first body portion 12. The body portion 13 in cooperative combination with the body portion 12 defines a first extrusion slot 42 extending a distance somewhat less than the length of the die 10. The body portion 13 defines an internal recess 43 which in cooperative combination with the recess 29 defines an internal plenum 44. The body portions 12 and 13 define an internal passageway 45 which is in operative communication with polymer supply means 46. The third body portion 14 defines an internal cavity or plenum 48. The cavity 48 is disposed adjacent the second edge 18 of the first body portion 12. The first and third body portions 12 and 14, respectively, define an extrusion orifice of elongate slot-like configuration 49 extending substantially parallel to the second edge 18 and to the slot 32. The body portions 13 and 14 are secured rigidly to the first body portion 12 by means 50. The body portions 12 and 14 define an internal passageway 51 which is in operative communication with a second source of heat plastified synthetic resinous material 52.

In FIGURE 2 there is depicted a section of the die 10 of FIGURE 1 taken along the line 2—2 showing the internal plenum 44, the extrusion apertures 42 and 49, the slots 19 and 32.

In operation of the apparatus in accordance with the invention, heat plastified synthetic thermoplastic material is supplied from the sources 46 and 52 to the plenums 44 and 48 and is extruded from the slots 42 and 49. The tapered plugs 24, 25 and 26 are forced into the slot 19 of the first body portion 12 to cause deflection of the land disposed between the slot 19 and the first edge 17 to provide the desired distribution of the flow of the thermoplastic resinous material. Similarly, the plugs 38, 39 and 40 are adjusted to provide optimum distribution of the thermoplastic material issuing from the slot 49.

A slot provided in the die body adjacent the die lips and tapered thread plugs and in engagement with the body permits adjustment of the die lips during operation to provide control of the distribution of the stream issuing from the die orifice. Dies in accordance with the present invention are readily prepared from flat stock by the simple expedient of milling the suitable recesses. Generally, it is beneficial and advantageous to form the tapered internal threaded holes such as the apertures 20, 21 and 22, 24, 35 and 36 prior to the milling of the slots 19 to 32. The body portions 12, 13 and 14 may be held together in any desired manner such as by bolting the body portions together or by maintaining the body portions in a clamp.

The present invention is readily applicable to single opening dies as well as double or multiple opening dies as illustrated.

The present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:
1. A die comprising:
   an elongated body; the elongated body defining
   a plenum,
   a pair of die lips and
   an extrusion passageway extending from the die lips to the plenum;
   the body defining a means to receive a stream of synthetic resinous material;
   a body defining a slot extending into the body adjacent to and parallel with a die lip, the slot being generally parallel to the extrusion passageway;
   the body defining a plurality of internally threaded tapered openings within the slot; the tapered openings being spaced in apart relationship to each other; at least one externally threaded, tapered, adjustably positionable plug threadably engaging the tapered openings within the die and adapted to vary the spacing between the die lips.
2. The die of claim 1 wherein the elongated body defines at least two individual and separate plenums;
   two extrusion passageways, each of the extrusion passageways having a slot adjacent thereto, each of the slots generally parallel to the extrusion passageways, the body defining tapered, internally threaded cavities within each slot and tapered, externaly threaded plugs disposed within the cavity in cooperative combination therewith and adapted to vary the spacing between the die lips.

References Cited

UNITED STATES PATENTS

| | | |
|---|---|---|
| 2,718,661 | 9/1955 | Russell. |
| 2,765,492 | 10/1956 | Velvel _____ 18—12 X |
| 2,998,624 | 9/1961 | Ricketts _____ 18—12 |
| 3,000,054 | 9/1961 | Seifried et al. _____ 18—12 |
| 3,112,527 | 12/1963 | Pankratz et al. _____ 18—12 |

WILLIAM J. STEPHENSON, *Primary Examiner.*